United States Patent
Chen et al.

(10) Patent No.: US 9,544,335 B2
(45) Date of Patent: Jan. 10, 2017

(54) METHOD AND SYSTEM FOR LOCAL CALLING VIA WEBPAGE

(75) Inventors: Lu Chen, Shenzhen (CN); Sheng Zhong, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 215 days.

(21) Appl. No.: 14/355,224

(22) PCT Filed: Feb. 27, 2012

(86) PCT No.: PCT/CN2012/071678
§ 371 (c)(1),
(2), (4) Date: Apr. 30, 2014

(87) PCT Pub. No.: WO2012/155593
PCT Pub. Date: Nov. 22, 2012

(65) Prior Publication Data
US 2014/0286333 A1 Sep. 25, 2014

(30) Foreign Application Priority Data
Nov. 1, 2011 (CN) .......................... 2011 1 0339918

(51) Int. Cl.
*H04L 29/06* (2006.01)
*G06F 9/54* (2006.01)
(Continued)

(52) U.S. Cl.
CPC ......... *H04L 65/1003* (2013.01); *G06F 9/4425* (2013.01); *G06F 9/4843* (2013.01); *G06F 9/547* (2013.01); *G06F 17/2235* (2013.01)

(58) Field of Classification Search
CPC .......................... H04L 65/1003; G06F 17/2235
(Continued)

(56) References Cited

U.S. PATENT DOCUMENTS 6,766,351 B1 7/2004 Datla
7,120,639 B1 10/2006 de Jong et al.
(Continued)

FOREIGN PATENT DOCUMENTS

CN 102118504 A 7/2011
JP 2009-245089 A 10/2009

OTHER PUBLICATIONS

International Search Report issued in corresponding application No. PCT/CN2012/071678 on Jul. 19, 2012.
(Continued)

*Primary Examiner* — Jamal Javaid
(74) *Attorney, Agent, or Firm* — Brundidge & Stanger, P.C.

(57) ABSTRACT

The present disclosure provides a method for local calling via a webpage, including that: a local calling operation instruction is serialized, the serialized local calling operation instruction is filled into a webpage as a hyperlink character string, and the webpage is sent to a server or a local operating system; and a browser acquires the webpage from the local operating system or the server according to a model of the operating system local to the browser local to the browser, de-serializes the hyperlink character string in the webpage, and requests, according to an instantiated local calling operation instruction obtained through the de-serialization, the operating system local to the browser to execute a local calling operation indicated by the instantiated local calling operation instruction. The present disclosure further provides a system for local calling via a webpage. With the method and system provided in the present disclosure, a new local calling function may be added without updating any browser code, thereby improving universality of local calling.

18 Claims, 9 Drawing Sheets

(51) Int. Cl.
*G06F 17/22* (2006.01)
*G06F 9/48* (2006.01)
*G06F 9/44* (2006.01)

(58) Field of Classification Search
USPC .................................................. 370/352
See application file for complete search history.

(56) References Cited

U.S. PATENT DOCUMENTS

| | | | |
|---|---|---|---|
| 7,139,370 B1 * | 11/2006 | Tse .................... | H04L 29/06027 |
| | | | 379/201.01 |
| 7,409,672 B1 | 8/2008 | Datla | |
| 7,475,082 B1 * | 1/2009 | de Jong ................. | G06F 9/465 |
| 2003/0233385 A1 * | 12/2003 | Srinivasa ................ | G06F 9/466 |
| | | | 718/1 |
| 2007/0258439 A1 | 11/2007 | Chu | |
| 2011/0314077 A1 * | 12/2011 | Pala ........................ | G06Q 30/06 |
| | | | 709/202 |

OTHER PUBLICATIONS

International Publication issued in corresponding application No. PCT/CN2012/071678 on Nov. 22, 2012.

English Translation of the Written Opinion of the International Search Authority in international application No. PCT/CN2012/071678, mailed on Jul. 19, 2012.

Supplementary European Search Report in European application No. 12784980.0, mailed on Aug. 19, 2016.

Anonymous: "Uniform Resource Identifier—Wikipedia" XP055293947, Retrieved from the Internet:URL:https://en.wikipedia.org/w/index.php?title=Uniform_Resource_Identifier&oldid=454 892051[retrieved on Aug. 5, 2016],mailed on Oct. 10, 2011, 8 pages.

* cited by examiner

METHOD AND SYSTEM FOR LOCAL CALLING VIA WEBPAGE

TECHNICAL FIELD

The disclosure relates to technology of webpage applications, and in particular to a method and system for local calling via a webpage.

BACKGROUND

As a basic element constituting a website, a webpage bears a variety of website applications with files, and the content of the webpage may be displayed with a browser. A webpage includes a so-called "hyperlink" point, or hyperlink, which is a Uniform Resource Locator (URL) indicated generally by a hyperlink character string containing a combination of a path and a name of a local or remote webpage file, representing a hyperlink (e.g. http://www.sipo.gov.cn/a.htm, C:\b.htm). The hyperlink in the webpage may be activated by clicking to acquire the webpage file in the webpage path corresponding to the hyperlink.

A World Wide Web is constructed according to a hypertext, which is a mesh-like text that organizes text information in various spaces using hyperlinks; local calling may be implemented via a hyperlink (namely, a hyperlink character string) in a webpage. However, an existing method of local calling via a hyperlink character string is limited in function to perform local calling using a local function of a browser and a certain third-part program, wherein as the local function of the browser and the third-part program are integrated in the browser, codes of the browser have to be updated or a plug-in has to be installed for the browser if a new function of local calling is to be added, leading to poor universality of this method of local calling.

SUMMARY

In view of the above, it is desired that embodiments of the disclosure provide a method and system for local calling via a webpage, capable of adding a new function of local calling without updating codes of a browser, thereby improving the universality of the method of local calling.

Accordingly, a technical solution of the disclosure is implemented as follows:

A method for local calling via a webpage, includes steps of:

serializing a local calling operation instruction, filling the serialized local calling operation instruction into a webpage as a hyperlink character string, and sending the webpage to a server or a local operating system; and acquiring, by a browser, the webpage from the local operating system or the server according to a model of an operating system local to the browser, de-serializing, by the browser, the hyperlink character string in the webpage, and requesting, according to an instantiated local calling operation instruction obtained through the de-serialization, the operating system local to the browser to execute a local calling operation indicated by the instantiated local calling operation instruction.

In an embodiment, the step of serializing a local calling operation instruction may be implemented by: acquiring a character string composed of a group of keywords and a protocol identifier, wherein, the group of keywords may include a command word pair and one or more parameter word pairs; the command word pair may include a command word and a value of the command word; each of the one or more parameter word pairs may include a parameter word and a value of the parameter word; the group of keywords may be separated from the protocol identifier by a first separator; each two of the command word pair and the one or more parameter word pairs included in the group of keywords may be separated by a second separator; the command word and the value of the command word, as well as a parameter word and the value of the parameter word, may be separated by a third separator; the value of the command word may correspond to a local calling operation instruction, the value of a parameter word may be used for storing a parameter of a local calling operation indicated by a command word corresponding to the parameter word.

In an embodiment, the value of a parameter word may be a group of parameter words composed of two or more parameter word pairs, wherein each two of the two or more parameter word pairs may be separated by a fourth separator, and each of the two or more parameter word pairs may be composed of a second parameter word and a value of the second parameter word separated by a fifth separator.

In an embodiment, when one or more of a single quotation mark, a double quotation mark, and the first separator to the fifth separator appear in the value of the command word and/or the value of a keyword, an escape character may be added in front of the one or more of the single quotation mark, the double quotation mark, and the first separator to the fifth separator.

In an embodiment, the step of de-serializing, by the browser, the hyperlink character string in the webpage may be implemented by:

splitting, by the browser, the hyperlink character string into the protocol identifier and the group of keywords according to the first separator; splitting the group of keywords into the command word pair and the one or more parameter word pairs according to the second separator; and then splitting each command word pair into a command word and the value of the command word as well as splitting each of the one or more parameter word pairs into a parameter word and the value of the parameter word according to the third separator.

After the step of de-serializing, by the browser, the hyperlink character string in the webpage, the method may further include steps of:

determining, by the browser, whether the hyperlink character string is a character string used for a local calling operation according to a protocol identifier obtained through the de-serialization; and when the hyperlink character string is one used for a local calling operation, executing a subsequent operation.

In an embodiment, the local calling operation instruction may be any of operations of: running a local application program, running a local background service, sending a message to a local application, broadcasting a message to multiple local applications, and acquiring data of a local data source.

In an embodiment, the webpage may be stored in the server, and the step of acquiring, by the browser, the webpage from the server according to the model of the operating system local to the browser may be implemented by:

sending, by the browser, according to the model of the operating system local to the browser, the server a local-calling-operation acquiring request to acquire the webpage, wherein the local-calling-operation acquiring request may include at least the model of the operating system local to the browser; and receiving, by the browser, a webpage sent by the server after the server receives the local-calling-operation acquiring request, wherein the webpage corresponds to the model of the operating system local to the browser and includes the serialized local calling operation instruction.

In an embodiment, the local calling operation instruction may be running a local application program; the local calling operation instruction may further include an application program identifier and a parameter transferred to the local application program upon the calling;

the step of requesting, by the browser, the operating system local to the browser to execute the local calling operation may be implemented by: generating, by the browser, according to the application program identifier and the parameter transferred to the local application program upon the calling, a local calling request recognizable to the operating system local to the browser; sending the operating system local to the browser the local calling request requesting the operating system local to the browser to execute the local application program identified by the application program identifier.

In an embodiment, the local calling operation instruction may be running a local background service; the local calling operation instruction may further include a background service identifier and a parameter transferred to the local background service upon the calling;

the step of requesting, by the browser, the operating system local to the browser to execute the local calling operation may be implemented by: generating, by the browser, according to the background service identifier and the parameter transferred to the local background service upon the calling, a local calling request recognizable to the operating system local to the browser; sending the operating system local to the browser the local calling request, requesting the operating system local to the browser to execute the background service program identified by the background service identifier.

In an embodiment, the local calling operation instruction may be sending a message to a local application; the local calling operation instruction may further include an application program identifier or a background service identifier, as well as a local message identifier and a parameter related to the message;

the step of requesting, by the browser, the operating system local to the browser to execute the local calling operation may be implemented by: sending, by the browser, a local message indicated by the local message identifier to an application program or a background service in the operating system local to the browser corresponding to the application program identifier or the background service identifier, wherein content of the local message may be stored in the parameter related to the message.

In an embodiment, the local calling operation instruction may be broadcasting a message to multiple local applications; the local calling operation instruction may further include a broadcast identifier and a parameter related to the broadcast message;

the step of requesting, by the browser, the operating system local to the browser to execute the local calling operation may be implemented by: searching, by the browser, according to the broadcast identifier, for an identifier of an application program or a background service capable of receiving the broadcast message; then sending the broadcast message to the application program or the background service capable of receiving the broadcast message, wherein the broadcast message may be stored in the parameter related to the broadcast message.

In an embodiment, the step of searching, by the browser, according to the broadcast identifier, for an identifier of an application program or a background service capable of receiving the broadcast message may be implemented by: when the identifier of the application program or the background service capable of receiving the broadcast message is recorded in a data source of the operating system local to the browser, searching, by the browser, the data source of the operating system local to the browser for the identifier of the application program or the background service capable of receiving the broadcast message.

In an embodiment, the local calling operation instruction may be acquiring data of a local data source; the local calling operation instruction may further include a data type identifier and a result-processing function identifier;

the step of requesting, by the browser, the operating system local to the browser to execute the local calling operation may be implemented by: sending, by the browser, a data request to a data source of the operating system local to the browser to request data identified by the data type identifier, receiving the data identified by the data type identifier sent by the data source, sending the received data to the webpage, and designating a function in the webpage identified by the result-processing function identifier to process the data identified by the data type identifier.

In an embodiment, the method may further include the step(s) of: before the step of requesting, by the browser, the operating system local to the browser to execute the local calling operation indicated by the instantiated local calling operation instruction, when the instantiated local calling operation instruction includes an authorization identifier, sending, by the browser, a user an operation confirmation request, requesting the user to confirm whether to execute the local calling operation; and going on to execute a subsequent operation when the user returns an instruction agreeing to execute the local calling operation.

In an embodiment, the local calling operation instruction may further include a link of an application program; and the method may further include the step(s) of: before the step of requesting, by the browser, the operating system local to the browser to execute the local calling operation indicated by the instantiated local calling operation instruction, determining whether the application program required exists in the operating system local to the browser; when the application program exists in the operating system, going on to execute a subsequent operation; otherwise when the application program is not in the operating system, sending, by the browser, a user a request on whether to download the application program; when the user returns to the browser an instruction agreeing to download the application program after receiving the request, downloading, by the browser, the application program according to the link of the application program.

A system for local calling via a webpage, includes:

a processor configured for serializing a local calling operation instruction, filling the serialized local calling operation instruction into a webpage as a hyperlink character string, and sending the webpage to a server or a local operating system; and a browser configured for acquiring the webpage from the local operating system or the server according to a model of the operating system local to the browser local to the browser, de-serializing the hyperlink character string in the webpage, and requesting, according to an instantiated local calling operation instruction obtained through the de-serialization, the operating system local to the browser to execute a local calling operation indicated by the instantiated local calling operation instruction.

In an embodiment, the webpage and the browser may form a local application program after the processor sends the webpage to the local operating system.

With the method and system for local calling via a webpage provided by the disclosure, it is possible to transfer a serialized local calling operation instruction to a browser via the webpage to instruct an operating system local to the browser to perform a corresponding local calling operation; In addition, a new serialized local calling operation instruction may be filled into the webpage to simply add a new local calling function without updating any browser code, thereby improving the universality of the method of local calling.

DETAILED DESCRIPTION

According to embodiments of the disclosure, a local calling operation instruction is serialized, the serialized local calling operation instruction is filled into a webpage as a hyperlink character string, and the webpage is sent to a server or a local operating system; and a browser acquires the webpage from the local operating system or the server according to a model of the operating system local to the browser local to the browser, de-serializes the hyperlink character string in the webpage, and requests, according to an instantiated local calling operation instruction obtained through the de-serialization, the operating system local to the browser to execute a local calling operation indicated by the instantiated local calling operation instruction.

In the disclosure, a local calling operation indicated by the instantiated local calling operation instruction is any of the following operations: running a local application, running a local background service, sending a message to a local application, broadcasting a message to multiple local applications, and acquiring data of a local data source; the local application includes a local application program and a local background service; the browser includes, but is not limited to: a program, device or tool capable of processing a webpage.

Figure 1:
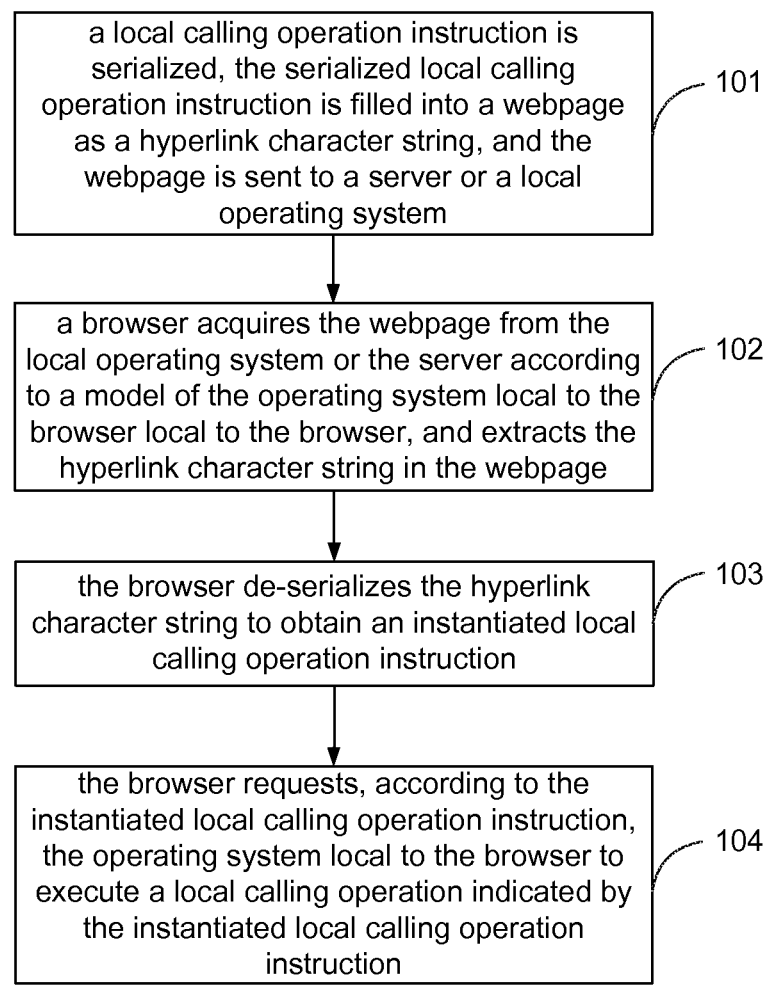
FIG. 1 is a flow chart of a method for local calling via a webpage.

FIG. 1 is a flow chart of a method for local calling via a webpage. According to FIG. 1, a flow of implementing the method according to the disclosure includes steps as follows.

In step 101, a local calling operation instruction is serialized, the serialized local calling operation instruction is filled into a webpage as a hyperlink character string, and the webpage is sent to a server or a local operating system.

Here, the local calling operation instruction is serialized specifically by acquiring a character string composed of a group of keywords and a protocol identifier, wherein the group of keywords includes a command word pair and one or more parameter word pairs; the command word pair includes a command word and a value of the command word; each of the one or more parameter word pairs includes a parameter word and a value of the parameter word; the group of keywords is separated from the protocol identifier by a first separator; each two of the command word pair and the one or more parameter word pairs included in the group of keywords are separated by a second separator; the command word and the value of the command word, as well as a parameter word and the value of the parameter word, are separated by a third separator; the value of the command word corresponds to a local calling operation instruction, the value of a parameter word is used for storing a parameter of a local calling operation indicated by a command word corresponding to the parameter word; each of a command word, the value of the command word, a parameter word, the value of a parameter word, and a separator may be composed of a character, a number, or combination thereof.

For example, the following character strings in quotation marks are serialized local calling operation instructions:

"intent:command=startActivity$action=android.intent.action.MAIN$category=android.intent.category.LAUNCHER$flags=0x10200000$component=com.android.settings/.Settings", "intent:command=startActivity$action=android.intent.action.DIAL$uri=tel:13681949589", 'intent:command=sendBroadcast$action=android.intent.action.CAMERA_BUTTON', 'intent:command=startActivity$action=android.intent.action.GET_CONTENT$type=vnd.android.cursor.item/phone$extra=@callback-S.showPB#@timeDelay-S.5s', wherein intent is a protocol identifier, command is a command word, startActivity and sendBroadcast each are a value of the command word, action, category, flags, component, uri, type, and extra are parameter words, android-.intentaction.MAIN, android.intent.category.LAUNCHER, 0x10200000, com.android.settings/.Settings, and so forth are values of parameter words; ":", "$", "=" are the first separator, the second separator, and the third separator, respectively; command=startActivity and command=sendBroadcast are command word pairs; action=android.intent.action.DIAL, uri=tel:13681949589, extra=@callback-S.showPB#@timeDelay-S.5s and the like are parameter word pairs, command=startActivity$action=android.intent.action.DIAL$uri=tel:13681949589 for example, is a group of keywords. Furthermore, in an embodiment, the aforementioned four character strings in single or double quotation marks, which represent serialized local calling operation instructions, may serve as a certain attribute value of a tag in a webpage.

Wherein, of the parameter word pair extra=@callback-S.showPB#@timeDelay-S.5s, the parameter word is extra, and the value of the parameter word is @callback-S.showPB#@timeDelay-S.5s, respectively, wherein the value of the parameter word is called a group of parameter words, which is formed by connecting a parameter word pair @callback-S.showPB and a parameter word pair @timeDelay-S.5s with a fourth separator "#", wherein the two parameter word pairs are formed respectively by connecting a parameter word @callback and the value of the parameter word S.showPB, as well as a parameter @timeDelay and the value of the parameter word S.5s with a fifth separator "-".

Moreover, as the serialized local calling operation instruction is located in a pair of single or double quotation marks, given that one may confuse one of the first to fifth separators and the single and/or double quotation mark with the value of a command word and/or the value of a keyword, namely, when one or more of a single quotation mark, a double quotation mark, and a first to fifth separators appear in the value of a command word and/or the value of a keyword, an escape character may be added in front of one or more of the single quotation marks, the double quotation marks, and the first separator to the fifth separator that appear in the value of the command word and/or the value of the keyword. For example, when the escape character is "\", a ", ', or the like in a key word value is replaced with a \", \', etc. In this case, when the escape character itself appears in the value of a command word and/or the value of a keyword (e.g. the backslash escape character "\" appears in the value of a command word and/or the value of a keyword), the "\" appearing in the value of the command word and/or the value of the keyword is replaced with "\\".

In an embodiment, the first to fifth separators and the escape character differ from each other.

In addition, note that in other cases wherein a confusion may occur, such as, when a serialized local calling operation instruction is put between symbols other than single or double quotation marks, for example. a pair of asterisks *, such processing with an escape character is also required.

The step of serializing and filling the serialized local calling operation instruction into a webpage could be implemented by a processor. The processor may then transmit the filled webpage to a server so as to be accessed by browser, or transmit the filled webpage to a local operating system, in which case, the webpage and the browser, both local to the local operating system, may form a local application program.

In step 102, a browser acquires the webpage from the local operating system or the server according to a model of the operating system local to the browser local to the browser, and extracts the hyperlink character string in the webpage.

Wherein, the hyperlink character string is extracted by acquiring a hyperlink character string in the webpage by activating a hyperlink, or directly searching the webpage for the hyperlink character string.

Specifically, the webpage is stored in the server. A browser may acquire the webpage from the server according to a model of the operating system local to the browser by:

sending, according to the model of the operating system local to the browser, the server a local-calling-operation acquiring request to acquire the webpage including the serialized local calling operation instruction, wherein the local-calling-operation acquiring request includes at least the model of the operating system local to the browser; and receiving a webpage sent by the server after the server receives the local-calling-operation acquiring request, wherein the webpage corresponds to the model of the operating system local to the browser and includes the serialized local calling operation instruction.

In step 103, the browser de-serializes the hyperlink character string to obtain an instantiated local calling operation instruction.

Here, a protocol identifier, a command word, the value of the command word, a parameter word and the value of the parameter word included in a hyperlink character string could be obtained by de-serializing the hyperlink character string; after the step of de-serializing, by the browser, the hyperlink character string in the webpage, the method may include that: the browser determines whether hyperlink character string is one used for a local calling operation according to a protocol identifier obtained through the de-serialization (e.g. the protocol identifier is compared with a pre-defined protocol identifier, and if the two protocol identifiers are the same, then the hyperlink character string is for a local calling operation, and the flow continues by executing a subsequent operation; otherwise if the two protocol identifiers differs, the flow is ended).

The browser de-serializes the hyperlink character string by splitting the hyperlink character string into the protocol identifier and the group of keywords according to the first separator, and de-serializing the group of keywords; wherein de-serializing the group of keywords includes that: any command word pair or any parameter word pair constituting the group of keywords is separated according to the second separator; and then each command word pair is split into a command word and the value of the command word and each parameter word pair is split into a parameter word and the value of the parameter word according to the third separator.

In addition, if the value of the parameter word includes the forth separator, then the value of the parameter word is split into multiple parameter word pairs according to the fourth separator, and each of the multiple parameter word pairs is split into a second parameter word and the value of the second parameter word according to the fifth separator.

In step 104, the browser requests, according to the instantiated local calling operation instruction, the operating system local to the browser to execute a local calling operation indicated by the instantiated local calling operation instruction.

Wherein, the step where the browser requests the operating system local to the browser to execute a local calling operation indicated by the instantiated local calling operation instruction includes cases as follows.

In the case that the local calling operation instruction indicates running a local application program, the local calling operation instruction further includes an application program identifier and a parameter transferred to the local application program upon the calling; accordingly, the step of requesting, by the browser, the operating system local to the browser to execute the local calling operation is that: the browser sends the operating system local to the browser a local calling request recognizable to the operating system local to the browser, requesting the operating system local to the browser to execute the local application program identified by the application program identifier. In an embodiment, the local calling request is generated according to the application program identifier and the parameter transferred to the local application program upon the calling.

In the case where the local calling operation instruction indicates running a local background service, the local calling operation instruction further includes background service identifier and a parameter transferred to the local background service upon the calling; accordingly, the step of requesting, by the browser, the operating system local to the browser to execute the local calling operation is that: the browser sends the operating system local to the browser a local calling request recognizable to the operating system, requesting the operating system to execute the background service program identified by the background service identifier. In an embodiment, the local calling request is generated according to the background service identifier and the parameter transferred to the local background service upon the calling.

In the case where the local calling operation instruction indicates sending a message to a local application, the local calling operation instruction further includes an application program identifier or a background service identifier, as well as a local message identifier and a parameter related to the message; accordingly, the step of requesting, by the browser, the operating system local to the browser to execute the local calling operation is that: the browser sends a local message indicated by the local message identifier to an application program or a background service in the operating system local to the browser corresponding to the application program identifier or the background service identifier. In an embodiment, the content of the local message is stored in the parameter related to the message.

In the case where the local calling operation instruction indicates broadcasting a message to multiple local applications, the local calling operation instruction further includes a broadcast identifier and a parameter related to the broadcast message; accordingly, the step of requesting, by the browser, the operating system local to the browser to execute the local calling operation includes that: the browser searches, according to the broadcast identifier, for an identifier of an application program or a background service capable of receiving the broadcast message; then sends the broadcast message to the application program or the background service capable of receiving the broadcast message; specifically, the step of searching, by the browser, according to the broadcast identifier, for an identifier of an application program or a background service capable of receiving the broadcast message may be that: when the identifier of the application program or the background service capable of receiving the broadcast message is recorded in a data source of the operating system local to the browser, the browser searches the data source of the operating system local to the browser for the identifier of the application program or the background service capable of receiving the broadcast message. In an embodiment, the broadcast message could be stored in the parameter related to the broadcast message.

In the case where the local calling operation instruction indicates acquiring data of a local data source, the local calling operation instruction further includes a data type identifier and a result-processing function identifier; accordingly, the step of requesting, by the browser, the operating system local to the browser to execute the local calling operation includes that: the browser sends a data request to a data source of the operating system local to the browser to request the data identified by the data type identifier, receives the data identified by the data type identifier sent by the data source, sends the received data to the webpage, and designates a function in the webpage identified by the result-processing function identifier to process the data identified by the data type identifier.

In certain cases, for example, an application program required does not exist in the browser, or it is necessary to download the required application program via the network; therefore, in any of the two cases, the local calling operation instruction further includes a link of an application program, which is the address for downloading the required application program, in which case, before the step of requesting the operating system local to the browser to execute the local calling operation indicated by the instantiated local calling operation instruction, the browser may determine whether the application program required exists in the operating system local to the browser; when the application program exists in the operating system, the flow continues to execute a subsequent operation; otherwise when the application program is not in the operating system, the browser sends a user a request on whether to download the application program; when the user returns to the browser an instruction agreeing to download the application program after receiving the request, the browser downloads the application program according to the link of the application program; otherwise if the user returns to the browser an instruction of disagreeing to download the application program, the browser does not execute the present local calling operation.

In addition, before the step of requesting, by the browser, the operating system local to the browser to execute the local calling operation indicated by the instantiated local calling operation instruction, when the instantiated local calling operation instruction includes an authorization identifier, the browser may send a user an operation confirmation request, requesting the user to confirm whether to execute the local calling operation; and go on to execute a subsequent operation when the user returns an instruction agreeing to execute the local calling operation, otherwise if the user returns an instruction disagreeing on the execution, then the present local calling operation is not executed, such that an operation of the browser is visible to the user (e.g. the user is able to know the local calling operation the browser is performing).

Figure 2:
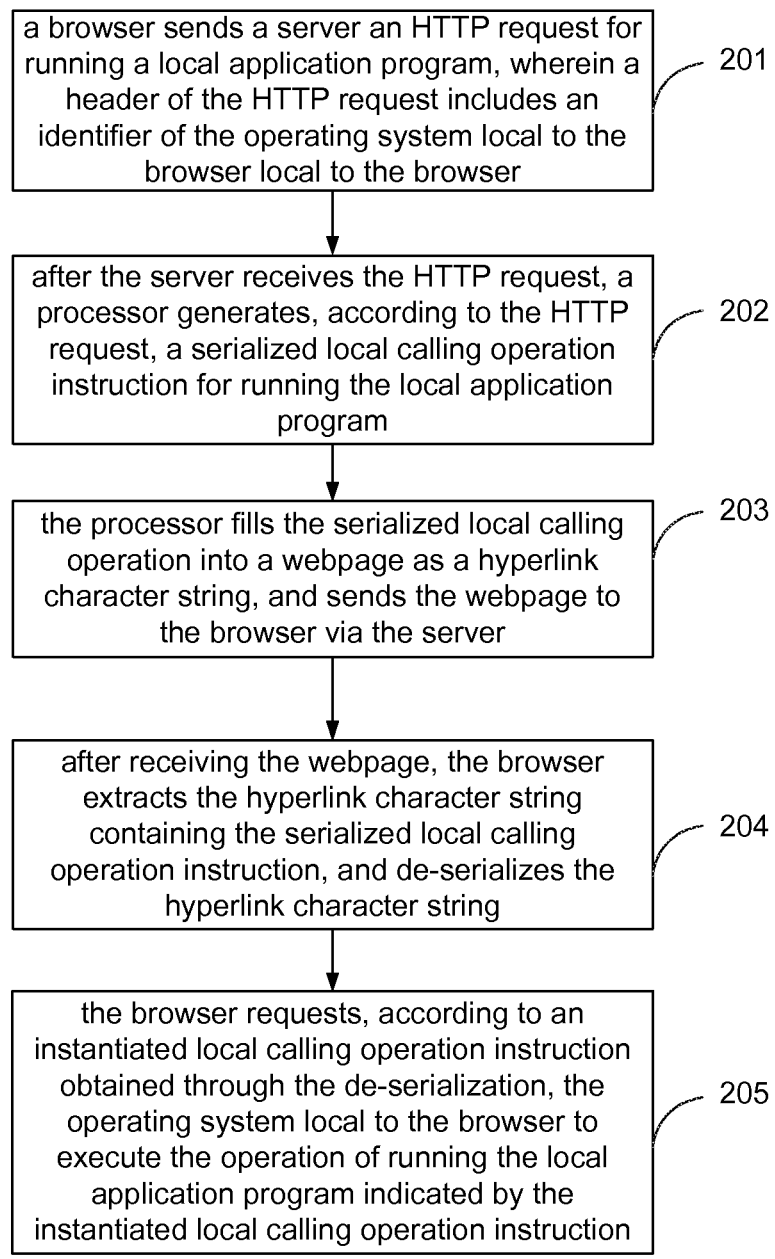
FIG. 2 is a flow chart of running a local application according to the method for local calling via a webpage.

FIG. 2 is a flow chart of running a local application according to the method for local calling via a webpage; according to FIG. 2, the flow includes steps as follows.

In step 201, a browser sends a server an HTTP request for running a local application program, wherein a header of the HTTP request includes an identifier of the operating system local to the browser local to the browser (e.g. a model of the operating system local to the browser).

In step 202, after the server receives the HTTP request, a processor generates, according to the HTTP request, a serialized local calling operation instruction for running the local application program;

wherein, after receiving the HTTP request, the server sends the HTTP request to the processor; the operation of generating the serialized local calling operation instruction is identical with operation of serializing the local calling operation instruction described in step 101.

In step 203, the processor fills the serialized local calling operation into a webpage as a hyperlink character string, and sends the webpage to the browser via the server.

In step 204, after receiving the webpage, the browser extracts the hyperlink character string containing the serialized local calling operation instruction, and de-serializes the hyperlink character string to obtain a protocol identifier, a command word, the value of the command word, a parameter word and the value of the parameter word included in the hyperlink character string;

wherein, the steps of extracting the hyperlink character string and of the de-serialization are identical with those in steps 102 and 103, respectively.

In step 205, the browser requests, according to an instantiated local calling operation instruction obtained through the de-serialization, the operating system local to the browser to execute the operation of running the local application program indicated by the instantiated local calling operation instruction.

Wherein, the requesting step is identical with that in step 104.

Figure 3:
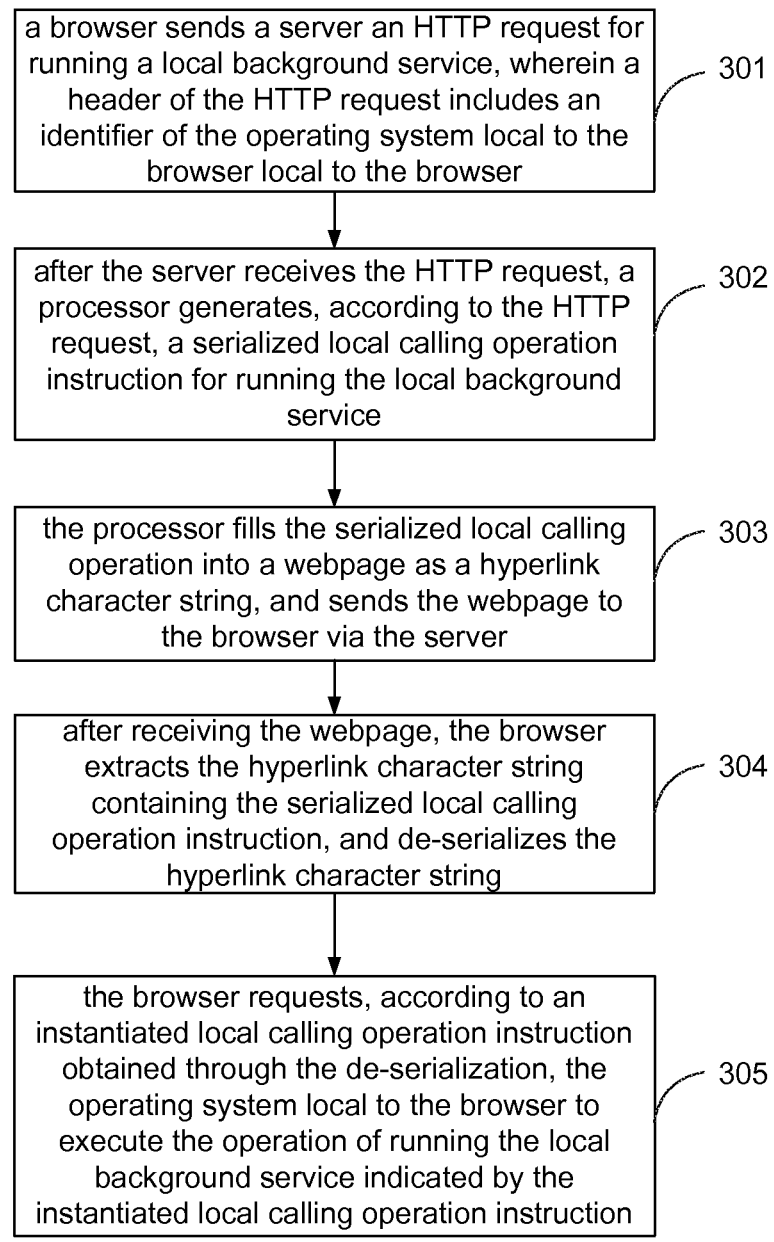
FIG. 3 is a flow chart of running a local background service according to the method for local calling via a webpage.

FIG. 3 is a flow chart of running a local background service according to the method for local calling via a webpage; according to FIG. 3, the flow includes steps as follows.

In step 301, a browser sends a server an HTTP request for running a local background service, wherein a header of the HTTP request includes an identifier of the operating system local to the browser local to the browser (e.g. a model of the operating system local to the browser).

In step 302, after the server receives the HTTP request, a processor generates, according to the HTTP request, a serialized local calling operation instruction for running the local background service;

wherein, after receiving the HTTP request, the server sends the HTTP request to the processor; the operation of generating the serialized local calling operation instruction is identical with operation of serializing the local calling operation instruction described in step 101.

In step 303, the processor fills the serialized local calling operation into a webpage as a hyperlink character string, and sends the webpage to the browser via the server.

In step 304, the browser requests, according to an instantiated local calling operation instruction obtained through the de-serialization, the operating system local to the browser to execute the operation of running the local background service indicated by the instantiated local calling operation instruction to obtain a protocol identifier, a command word, the value of the command word, a parameter word and the value of the parameter word included in the hyperlink character string;

wherein, the steps of extracting the hyperlink character string and of the de-serialization are identical with those in steps 102 and 103, respectively.

In step 305, the browser requests, according to an instantiated local calling operation instruction obtained through the de-serialization, the operating system local to the browser to execute the operation of running the local background service indicated by the instantiated local calling operation instruction.

Wherein, the requesting step is identical with that in step 104.

Figure 4:
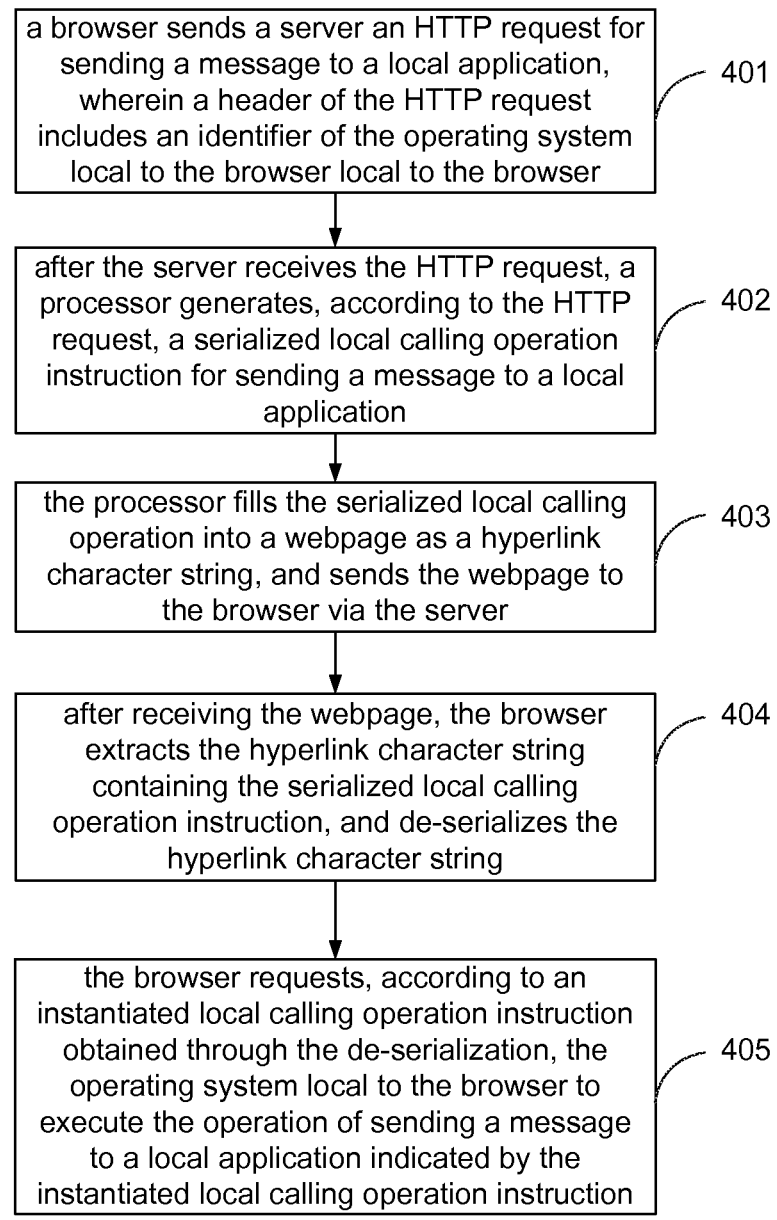
FIG. 4 is a flow chart of sending a message to a local application according to the method for local calling via a webpage.

FIG. 4 is a flow chart of sending a message to a local application according to the method for local calling via a webpage; according to FIG. 4, the flow includes steps as follows.

In step 401, a browser sends a server an HTTP request for sending a message to a local application, wherein a header of the HTTP request includes an identifier of the operating system local to the browser local to the browser (e.g. a model of the operating system local to the browser).

In step 402, after the server receives the HTTP request, a processor generates, according to the HTTP request, a serialized local calling operation instruction for sending a message to a local application;

wherein, after receiving the HTTP request, the server sends the HTTP request to the processor; the operation of generating the serialized local calling operation instruction is identical with operation of serializing the local calling operation instruction described in step 101.

In step 403, the processor fills the serialized local calling operation into a webpage as a hyperlink character string, and sends the webpage to the browser via the server.

In step 404, after receiving the webpage, the browser extracts the hyperlink character string containing the serialized local calling operation instruction, and de-serializes the hyperlink character string to obtain a protocol identifier, a command word, the value of the command word, a parameter word and the value of the parameter word included in the hyperlink character string;

wherein, the steps of extracting the hyperlink character string and of the de-serialization are identical with those in steps 102 and 103, respectively.

In step 405, the browser requests, according to an instantiated local calling operation instruction obtained through the de-serialization, the operating system local to the browser to execute the operation of sending a message to a local application indicated by the instantiated local calling operation instruction.

Wherein, the requesting step is identical with that in step 104.

Figure 5:
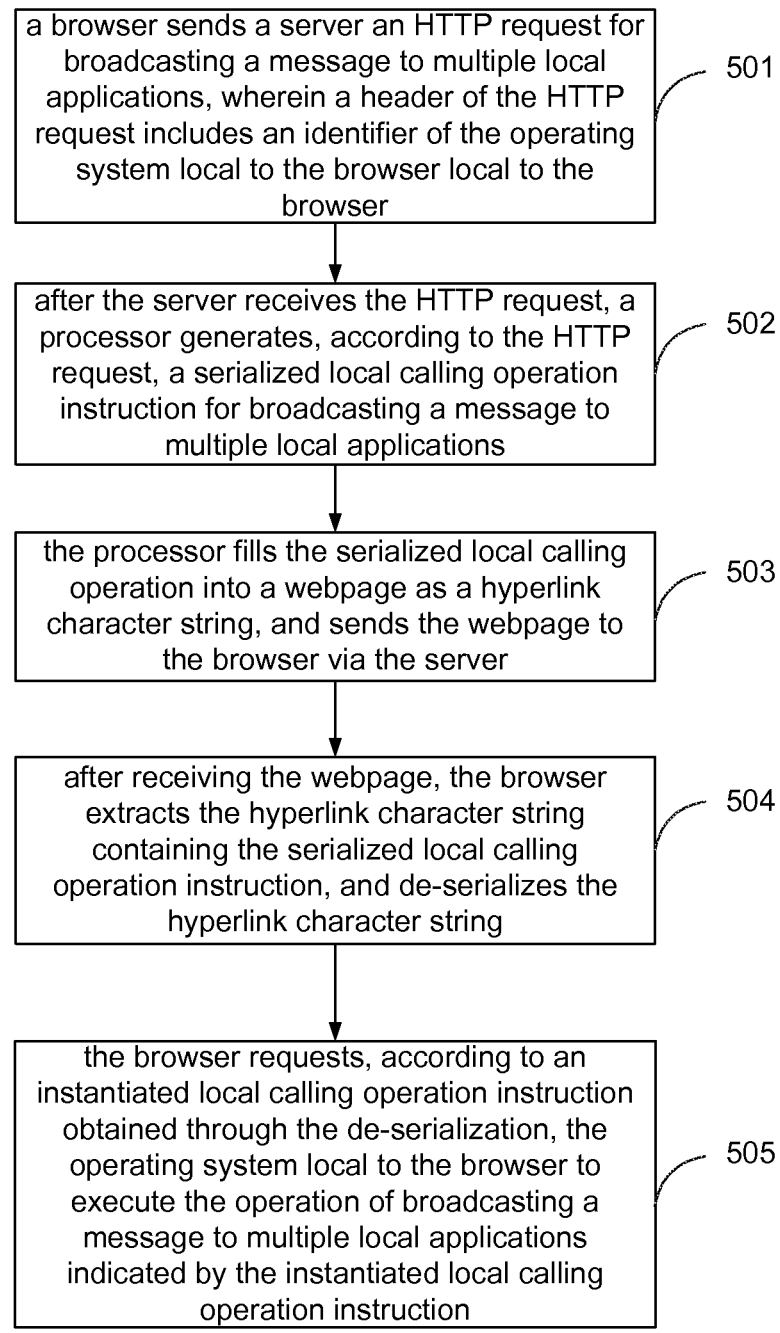
FIG. 5 is a flow chart of broadcasting a message to multiple local applications according to the method for local calling via a webpage.

FIG. 5 is a flow chart of broadcasting a message to multiple local applications according to the method for local calling via a webpage; according to FIG. 5, the flow includes steps as follows In step 501, a browser sends a server an HTTP request for broadcasting a message to multiple local applications, wherein a header of the HTTP request includes an identifier of the operating system local to the browser local to the browser (e.g. a model of the operating system local to the browser).

In step 502, after the server receives the HTTP request, a processor generates, according to the HTTP request, a serialized local calling operation instruction for broadcasting a message to multiple local applications;

wherein, after receiving the HTTP request, the server sends the HTTP request to the processor; the operation of generating the serialized local calling operation instruction is identical with operation of serializing the local calling operation instruction described in step 101.

In step 503, the processor fills the serialized local calling operation into a webpage as a hyperlink character string, and sends the webpage to the browser via the server.

In step 504, after receiving the webpage, the browser extracts the hyperlink character string containing the serialized local calling operation instruction, and de-serializes the hyperlink character string to obtain protocol identifier, command word, the value of the command word, parameter word and value of a parameter word included in the hyperlink character string;

wherein, the steps of extracting the hyperlink character string and of the de-serialization are identical with those in steps 102 and 103, respectively.

In step 505, the browser requests, according to an instantiated local calling operation instruction obtained through the de-serialization, the operating system local to the browser to execute the operation of running the local application program indicated by the instantiated local calling operation instruction.

Wherein, the requesting step is identical with that in step 104.

Figure 6:
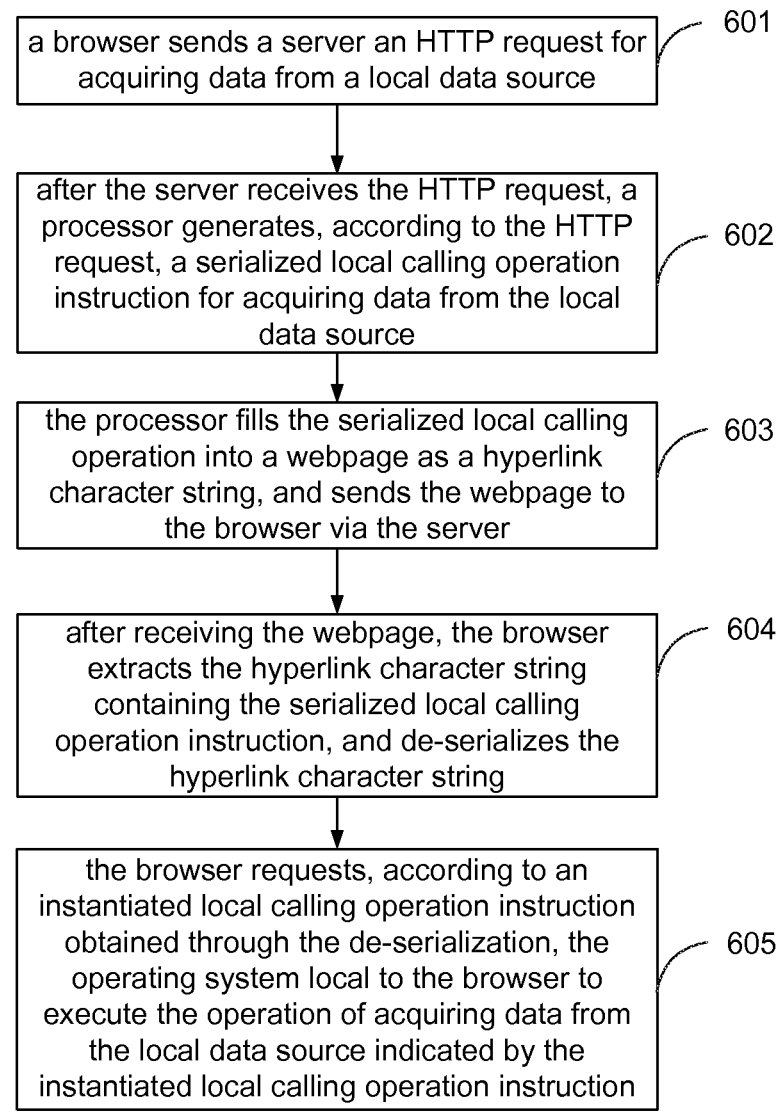
FIG. 6 is a flow chart of acquiring data from a local data source according to the method for local calling via a webpage.

FIG. 6 is a flow chart of acquiring data from a local data source according to the method for local calling via a webpage; according to FIG. 6, the flow includes steps as follows In step 601, a browser sends a server an HTTP request for acquiring data from a local data source, wherein a header of the HTTP request includes an identifier of the operating system local to the browser local to the browser (e.g. a model of the operating system local to the browser).

In step 602, after the server receives the HTTP request, a processor generates, according to the HTTP request, a serialized local calling operation instruction for acquiring data from the local data source;

wherein, after receiving the HTTP request, the server has to send the HTTP request to the processor; the operation of generating the serialized local calling operation instruction is identical with operation of serializing the local calling operation instruction described in step 101.

In step 603, the processor fills the serialized local calling operation into a webpage as a hyperlink character string, and sends the webpage to the browser via the server.

In step 604, after receiving the webpage, the browser extracts the hyperlink character string containing the serialized local calling operation instruction, and de-serializes the hyperlink character string to obtain a protocol identifier, a command word, the value of the command word, a parameter word and the value of the parameter word included in the hyperlink character string;

wherein, the steps of extracting the hyperlink character string and of the de-serialization are identical with those in steps 102 and 103, respectively.

In step 605, the browser requests, according to an instantiated local calling operation instruction obtained through the de-serialization, the operating system local to the browser to execute the operation of acquiring data from the local data source indicated by the instantiated local calling operation instruction.

Wherein, the requesting step is identical with that in step 104.

Figure 7:
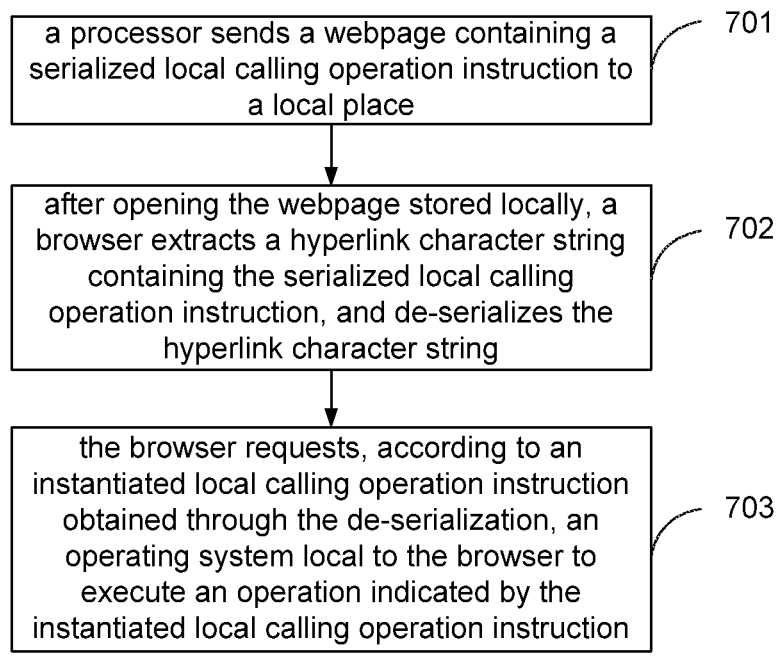
FIG. 7 is a flow chart of implementing a local application program according to the method for local calling via a webpage.

FIG. 7 is a flow chart of implementing a local application program according to the method for local calling via a webpage; according to FIG. 7, the flow includes steps as follows In step 701, a processor sends a webpage containing a serialized local calling operation instruction to a local place.

In step 702, after opening the webpage stored locally, a browser extracts a hyperlink character string containing the serialized local calling operation instruction, and de-serializes the hyperlink character string to obtain a protocol identifier, a command word, the value of the command word, a parameter word and the value of the parameter word included in the hyperlink character string;

wherein, the steps of extracting the hyperlink character string and of the de-serialization are identical with those in steps 102 and 103, respectively.

In step 703, the browser requests, according to an instantiated local calling operation instruction obtained through the de-serialization, an operating system local to the browser to execute an operation indicated by the instantiated local calling operation instruction.

Wherein, the requesting step is identical with that in step 104.

Note that as the disclosure has to be run in different operating systems, wherein both the expression of an identifier and a way of calling a local application differ, the processor may generate different local calling operation instructions according to different operating systems, fill the instructions as hyperlink character strings into different webpages, send these webpages to the server, which may send the webpages to operating systems corresponding to the webpages via various networks, so that a browser in these operating systems could operate according to a serialized local calling operation instruction carried in these webpages.

Figure 8:
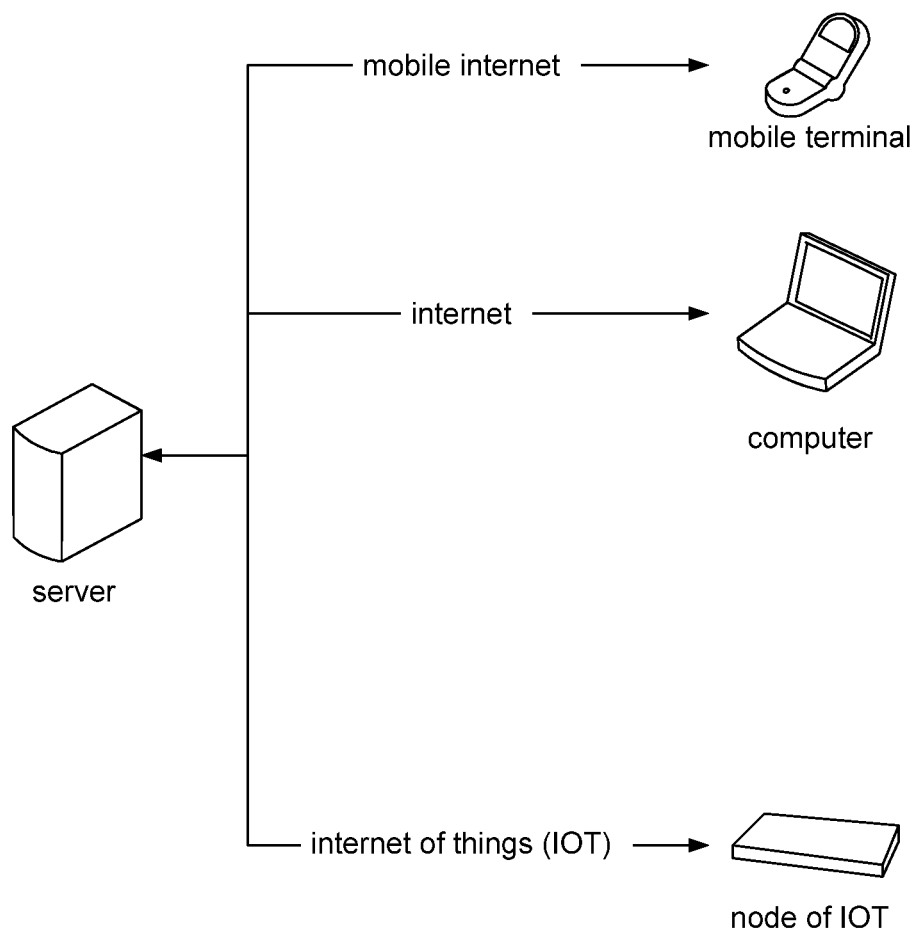
FIG. 8 is a schematic diagram showing compatibility of the method for local calling via a webpage with different operating systems.

FIG. 8 is a schematic diagram showing compatibility of the method for local calling via a webpage with different operating systems; according to FIG. 8, the server stores multiple webpages containing serialized local calling operation instructions aiming at different operating systems, and the server could send these webpages to different devices via a network such as mobile internet, internet and internet of things (IOT), so that a browser in these devices performs processing according to a serialized local calling operation instruction in these webpages.

In addition, in order to implement a local application program, such a webpage can be stored directly in a corresponding operating system, so that a browser in the operating system could process the webpage.

Figure 9:
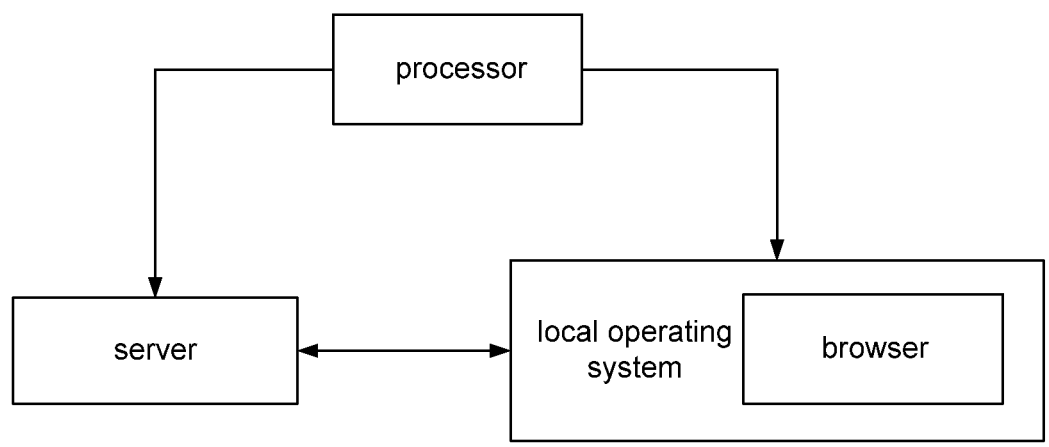
FIG. 9 is a schematic diagram of a structure of a system for local calling via a webpage according to the disclosure.

FIG. 9 is a schematic diagram of a structure of a system for local calling via a webpage according to the disclosure; as shown in FIG. 9, the system includes a processor and a browser as follows.

The processor is configured for serializing a local calling operation instruction, filling the serialized local calling operation instruction into a webpage as a hyperlink character string, and sending the webpage to a server or a local operating system.

The browser is configured for acquiring the webpage from the local operating system or the server according to a model of the operating system local to the browser local to the browser, de-serializing the hyperlink character string in the webpage, and requesting, according to an instantiated local calling operation instruction obtained through the de-serialization, the operating system local to the browser to execute a local calling operation indicated by the instantiated local calling operation instruction.

In an embodiment, the webpage and the browser form a local application program after the processor sends the webpage to the local operating system.

In conclusion, with the method and system of the disclosure, a local calling instruction is transmitted to a browser via a hyper character string in a webpage; the browser could then perform a local calling operation according to the local calling operation instruction. In addition, the browser may be instructed to perform a new local calling operation by updating the hyperlink character string in the webpage, and the implementation herein thus has better universality.

In practice, a format of a webpage file used in the disclosure includes, but is not limited to, the eXtensible HyperText Markup Language (XHTML), Wireless Application Protocol (WAP), Server-parsed HyperText Markup Language (SHTML), eXtensiive Markup Language (XML), WAP Binary XML (WBXML), JavaScript Serialized Object Notation (JSON), etc.

A form of a webpage file used in the disclosure includes, but is not limited to: a text file, a binary file, a compressed file, etc.

A file transfer protocol adopted in the disclosure includes, but is not limited to: an HTTP, an HTTP over Secure socket layer (HTTPS), a File Transfer Protocol (FTP), a Virtual Private Network (VPN), a Security Socket Layer (SSL), transmission with compression, transmission with encryption, transmission with signature, etc.

A format of a serialized local calling operation instruction adopted in the disclosure includes, but is not limited to, addition or reduction of a component of a serialized local calling operation instruction, including adding a protocol sub-identifier; or using XML instead of a separator such as one or more of the first, the second, and the third separators and the like to serialize the local calling operation instruction.

Changes to the method of generating, storing and transferring a local calling instruction include, but are not limited to: instead of using a hyperlink character string, using another existing webpage tag or attribute; or using a custom tag or attribute; or using a language such as JavaScript instead of a hyperlink character string to transfer the local calling instruction.

Changes to the way that a processor obtains the protocol identifier in the disclosure include, but are not limited to, carrying the protocol identifier in a GET request of the HTTP; or instead of using the protocol identifier, using different URL addresses in different operating systems; or instead of using the protocol identifier, determining the model of the operating system local to the browser via previous interaction between a browser and a server.

What described are merely embodiments of the disclosure, and are not intended to limit the disclosure. For those skilled in the art, various changes and variations may be made to the disclosure. The various modifications, equivalent replacements and improvements made without departing from the scope of the disclosure or without sacrificing all of its advantageous effects shall fall within the scope of the claims.

The invention claimed is:

1. A method for local calling via a webpage, comprising:
generating a local calling operation instruction according to an operating system;
serializing the local calling operation instruction, filling the serialized local calling operation instruction into a webpage as a hyperlink character string, and sending the webpage to a server or a local operating system; and
acquiring, by a browser, the webpage from the local operating system or the server according to a model of an operating system local to the browser, de-serializing, by the browser, the hyperlink character string in the webpage, and requesting, according to an instantiated local calling operation instruction obtained through the de-serialization, the operating system local to the browser to execute a local calling operation indicated by the instantiated local calling operation instruction,
wherein the step of serializing the local calling operation instruction is:
acquiring a character string composed of a group of keywords and a protocol identifier,
wherein the group of keywords comprises a command word pair and one or more parameter word pairs;
the command word pair comprises a command word and a value of the command word;
each of the one or more parameter word pairs comprises a parameter word and a value of the parameter word;
the group of keywords is separated from the protocol identifier by a first separator;
each two of the command word pair and the one or more parameter word pairs comprised in the group of keywords are separated by a second separator;
the command word and the value of the command word, as well as a parameter word and the value of the parameter word, are separated by a third separator; and
the value of the command word corresponds to a local calling operation instruction, the value of a parameter word is used for storing a parameter of a local calling operation indicated by a command word corresponding to the parameter word.

2. The method according to claim 1, wherein the value of a parameter word is a group of parameter words composed of two or more parameter word pairs, wherein each two of the two or more parameter word pairs are separated by a fourth separator, and each of the two or more parameter word pairs is composed of a second parameter word and a value of the second parameter word separated by a fifth separator.

3. The method according to claim 2, wherein when one or more of a single quotation mark, a double quotation mark, and the first separator to the fifth separator appear in the value of the command word and/or the value of a keyword, an escape character is added in front of the one or more of the single quotation mark, the double quotation mark, and the first separator to the fifth separator.

4. The method according to claim 1, wherein the step of de-serializing, by the browser, the hyperlink character string in the webpage comprises:
splitting, by the browser, the hyperlink character string into the protocol identifier and the group of keywords according to the first separator;
splitting the group of keywords into the command word pair and the one or more parameter word pairs according to the second separator; and
then splitting each command word pair into a command word and the value of the command word as well as splitting each of the one or more parameter word pairs into a parameter word and the value of the parameter word according to the third separator.

5. The method according to claim 1, further comprising:
after the step of de-serializing, by the browser, the hyperlink character string in the webpage,
determining, by the browser, whether the hyperlink character string is a character string used for a local calling operation according to a protocol identifier obtained through the de-serialization; and
when the hyperlink character string is one used for a local calling operation, executing a subsequent operation.

6. The method according to claim 1, wherein the local calling operation instruction is any of operations of:
running a local application program, running a local background service, sending a message to a local application, broadcasting a message to multiple local applications, and acquiring data of a local data source.

7. The method according to claim 1 wherein the webpage is stored in the server, the step of acquiring, by the browser, the webpage from the server according to the model of the operating system local to the browser comprises:
sending, by the browser, according to the model of the operating system local to the browser, the server a local-calling-operation acquiring request to acquire the webpage, wherein the local-calling-operation acquiring request comprises at least the model of the operating system local to the browser; and
receiving, by the browser, a webpage sent by the server after the server receives the local-calling-operation acquiring request, wherein the webpage corresponds to the model of the operating system local to the browser and comprises the serialized local calling operation instruction.

8. The method according to claim 1, wherein the local calling operation instruction is running a local application program; the local calling operation instruction further comprises an application program identifier and a parameter transferred to the local application program upon the calling;

the step of requesting, by the browser, the operating system local to the browser to execute the local calling operation is:
generating, by the browser, according to the application program identifier and the parameter transferred to the local application program upon the calling, a local calling request recognizable to the operating system local to the browser; and
sending the operating system local to the browser the local calling request requesting the operating system local to the browser to execute the local application program identified by the application program identifier.

9. The method according to claim 1, wherein the local calling operation instruction is running a local background service;
the local calling operation instruction further comprises a background service identifier and a parameter transferred to the local background service upon the calling;
the step of requesting, by the browser, the operating system local to the browser to execute the local calling operation is:
generating, by the browser, according to the background service identifier and the parameter transferred to the local background service upon the calling, a local calling request recognizable to the operating system local to the browser; and
sending the operating system local to the browser the local calling request, requesting the operating system local to the browser to execute the background service program identified by the background service identifier.

10. The method according to claim 1, wherein the local calling operation instruction is sending a message to a local application;
the local calling operation instruction further comprises an application program identifier or a background service identifier, as well as a local message identifier and a parameter related to the message;
the step of requesting, by the browser, the operating system local to the browser to execute the local calling operation includes:
sending, by the browser, a local message indicated by the local message identifier to an application program or a background service in the operating system local to the browser corresponding to the application program identifier or the background service identifier, wherein content of the local message is stored in the parameter related to the message.

11. The method according to claim 1, wherein the local calling operation instruction is broadcasting a message to multiple local applications;
the local calling operation instruction further comprises a broadcast identifier and a parameter related to the broadcast message;
the step of requesting, by the browser, the operating system local to the browser to execute the local calling operation comprises:
searching, by the browser, according to the broadcast identifier, for an identifier of an application program or a background service capable of receiving the broadcast message; and
then sending the broadcast message to the application program or the background service capable of receiving the broadcast message,
wherein the broadcast message is stored in the parameter related to the broadcast message.

12. The method according to claim 11, wherein the step of searching, by the browser, according to the broadcast identifier, for an identifier of an application program or a background service capable of receiving the broadcast message includes:
when the identifier of the application program or the background service capable of receiving the broadcast message is recorded in a data source of the operating system local to the browser, searching, by the browser, the data source of the operating system local to the browser for the identifier of the application program or the background service capable of receiving the broadcast message.

13. The method according to claim 1, wherein the local calling operation instruction is acquiring data of a local data source;
the local calling operation instruction further comprises a data type identifier and a result-processing function identifier;
the step of requesting, by the browser, the operating system local to the browser to execute the local calling operation comprises:
sending, by the browser, a data request to a data source of the operating system local to the browser to request data identified by the data type identifier, receiving the data identified by the data type identifier sent by the data source, sending the received data to the webpage, and designating a function in the webpage identified by the result-processing function identifier to process the data identified by the data type identifier.

14. The method according to claim 1, further comprising:
before the step of requesting, by the browser, the operating system local to the browser to execute the local calling operation indicated by the instantiated local calling operation instruction, when the instantiated local calling operation instruction comprises an authorization identifier, sending, by the browser, a user an operation confirmation request, requesting the user to confirm whether to execute the local calling operation; and
going on to execute a subsequent operation when the user returns an instruction agreeing to execute the local calling operation.

15. The method according to claim 1, wherein the local calling operation instruction further comprises a link of an application program; and
the method further comprises:
before the step of requesting, by the browser, the operating system local to the browser to execute the local calling operation indicated by the instantiated local calling operation instruction, determining whether the application program required exists in the operating system local to the browser;
when the application program exists in the operating system, going on to execute a subsequent operation;
otherwise when the application program is not in the operating system, sending, by the browser, a user a request on whether to download the application program; and
when the user returns to the browser an instruction agreeing to download the application program after receiving the request, downloading, by the browser, the application program according to the link of the application program.

16. A system for local calling via a webpage, comprising:
a processor configured for generating a local calling operation instruction according to an operating system, serializing the local calling operation instruction, filling the serialized local calling operation instruction into a webpage as a hyperlink character string, and sending the webpage to a server or a local operating system; and a browser configured for acquiring the webpage from the local operating system or the server according to a model of the operating system local to the browser, de-serializing the hyperlink character string in the webpage, and requesting, according to an instantiated local calling operation instruction obtained through the de-serialization, the operating system local to the browser to execute a local calling operation indicated by the instantiated local calling operation instruction, wherein the processor is configured for acquiring a character string composed of a group of keywords and a protocol identifier, wherein the group of keywords comprises a command word pair and one or more parameter word pairs;

the command word pair comprises a command word and a value of the command word;

each of the one or more parameter word pairs comprises a parameter word and a value of the parameter word;

the group of keywords is separated from the protocol identifier by a first separator;

each two of the command word pair and the one or more parameter word pairs comprised in the group of keywords are separated by a second separator;

the command word and the value of the command word, as well as a parameter word and the value of the parameter word, are separated by a third separator; and the value of the command word corresponds to a local calling operation instruction, the value of a parameter word is used for storing a parameter of a local calling operation indicated by a command word corresponding to the parameter word.

17. The system according to claim 16, wherein the webpage and the browser form a local application program after the processor sends the webpage to the local operating system.

18. A method for local calling via a webpage, comprising:

generating a local calling operation instruction according to an operating system;

serializing the local calling operation instruction, filling the serialized local calling operation instruction into a webpage as a hyperlink character string, and sending the webpage to a server or a local operating system; and acquiring, by a browser, the webpage from the local operating system or the server according to a model of an operating system local to the browser, de-serializing, by the browser, the hyperlink character string in the webpage, and requesting, according to an instantiated local calling operation instruction obtained through the de-serialization, the operating system local to the browser to execute a local calling operation indicated by the instantiated local calling operation instruction, wherein the webpage is stored in the server, the step of acquiring, by the browser, the webpage from the server according to the model of the operating system local to the browser comprises:

sending, by the browser, according to the model of the operating system local to the browser, the server a local-calling-operation acquiring request to acquire the webpage, wherein the local-calling-operation acquiring request comprises at least the model of the operating system local to the browser; and receiving, by the browser, a webpage sent by the server after the server receives the local-calling-operation acquiring request, wherein the webpage corresponds to the model of the operating system local to the browser and comprises the serialized local calling operation instruction.

* * * * *